3,322,841
POLYBENZYL AROMATICS
Emil J. Geering, Grand Island, N.Y., assignor to Hooker Chemical Corporation, Niagara Falls, N.Y., a corporation of New York
No Drawing. Filed Mar. 22, 1963, Ser. No. 267,332
16 Claims. (Cl. 260—668)

This invention relates to the preparation of liquid and resinous low molecular weight polybenzyl aromatic compounds and to methods for their use.

Monobenzylated aromatic compounds can be prepared by the condensation of a halomethyl aromatic compound either with itself or with another aromatic compound in the presence of a Friedel-Crafts catalyst. Such condensation can result in the formation of aromatics which are substituted by more than one benzyl radical and are often undesirable. Novel utilization and extension of this often undesirable side reaction in conjunction with a liquid catalyst system are characteristic of the present invention.

When benzene and benzyl chloride, examples of the reactants of this invention, are condensed according to the method of the present invention, a liquid mixture is formed. Reaction of the initial product, diphenylmethane, with benzyl chloride gives a mixture of ortho- and para-dibenzylbenzene. Action of additional benzyl chloride converts a portion of the dibenzylbenzene isomers to a mixture of bis(2,2'-dibenzyl)diphenylmethane, bis(4,4'-dibenzyl)diphenylmethane, bis(2,4'-dibenzyl)diphenylmethane and 1,2,4-tribenzylbenzene. A portion of this mixture is further benzylated to give a third family of isomers. The concurrent self-condensation of benzyl chloride gives ortho- and para-chloromethyldiphenylmethane. These isomers self-condense with the above isomers, with benzene or with benzyl chloride. When the reaction is complete, no chloromethyl groups remain. The products are represented by the formula:

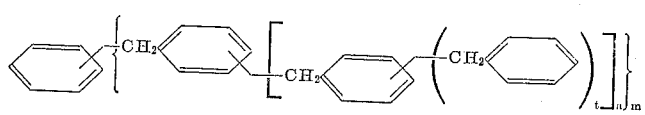

where $m$ is one to six, $n$ is zero to five for each of the $m$ benzyl groups, and $t$ is zero to five for each of the $n$ benzyl groups. Compounds made by the inventive process are defined generically by the formula:

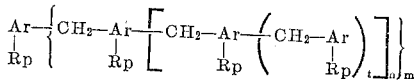

where Ar is an aryl group, R is a substituent group thereon and is selected from the group consisting of alkyl, aryl, alkaryl, halogen, alkoxy, aryloxy, carboalkoxy, carboaryloxy, carboalkaryloxy, acyloxy and hydroxy usually of 1 to 20 carbon atoms, $p$ is the number of R groups substituted thereon, usually from 0 to 4, and $m$, $n$, and $t$ are as previously defined.

As was previously mentioned, such condensations have been carried out in the past with solid anhydrous Friedel-Crafts type catalysts, which are separated from the product by filtration or first hydrolyzed and then separated as an aqueous solution. The former step requires handling a solid, reactive, moisture-sensitive material and the latter involves loss of the catalyst and creates a disposal problem.

It is, therefore, an object of this invention to provide a novel and improved method for producing a liquid or resinous mixture of compounds of several molecular weights and composed of a plurality of substituted or unsubstituted aromatic rings, or nuclei, joined by methylene groups.

Another object of this invention is to provide a novel and improved process whereby halomethylaromatic compounds are self-condensed, are condensed with a "substrate" material, and are condensed with the successive products of these condensations.

An object is also to provide a novel catalyst system whereby the foregoing objects are accomplished and another object is to provide such a system having distinct advantages with respect to ease of handling over the prior art solid catalysts.

Another object of this invention is to provide a method for controlling the molecular weight, and consequently, the viscosity, pour point, volatility, and solubility of the final products of the condensations.

Still other objects and advantages will become apparent from the detailed description of the invention which follows.

The objects of this invention are accomplished by effecting the condensation of an aromatic compound containing halomethyl groups as substituents, hereinafter referred to as a halomethylaromatic compound, and a substrate material or the self condensation of a halomethylaromatic compound in the presence of a catalyst solution of a metal chloride in a suitable solvent. When the reaction is complete, the catalyst solution is a separate layer or phase and is easily separated from the organic layer and recycled for reuse without appreciable loss, to leave the pure product.

Halomethylaromatic compounds sufficiently reactive to condense with a substrate material and stable under the conditions of the reaction are suitable for the process of this invention. Preferred are mono- and bis-chloromethyl compounds; monochloromethylaromatics are more preferred and examples include: benzyl chloride, chloromethylnaphthalene, chloromethylanthracene, chloromethylthiophene and chloromethyldibenzylthiophene. The corresponding compounds can be used wherein the halogen is bromine.

Examples of bischloromethylaromatics suitable for use in this invention include: 1,2-bis(chloromethyl)benzene, 1,4-bis(chloromethyl)benzene, bis(chloromethyl)durene, and 1,5-bis(chloromethyl)naphthalene. Chlorine can be replaced by bromine.

Most preferred, in order of preference, are halomethylaromatic compounds derived from the hydrocarbons such as benzene, naphthalene, and anthracene; and thiophene. As will be seen, most of the useful halomethylaromatic compounds will be of three aromatic rings or fewer and of 7 to about 20 carbon atoms per molecule.

The halomethylaromatic compounds can also carry on the aromatic ring preferably one or two but sometimes more substituents including alkyl, aryl, alkaryl, halogen, alkoxy, aryloxy, carboalkoxy, carboaryloxy, carboalkaryloxy, and acyloxy; alkyl, halogen and alkoxy are preferred. The halogen can be fluorine, chlorine, bromine or iodine. Examples of substituted halomethylaromatic compounds containing the benzene ring include chloromethyltoluene, chloromethylxylene, chloromethylmesitylene, chloromethyldurene, chloromethyldecylbenzene, chloromethyldiphenylmethane, chloromethyldibenzylbenzene, chloromethyldiphenyl, chloromethyldiphenylether, chloromethyldiphenoxybenzene, chloromethylbromobenzene, chloromethylfluorobenzene, chloromethyliodobenzene, chloromethyltrichlorobenzene, chloromethylanisole, chloromethyltetramethoxybenzene, ethylchloromethylbenzoate, chloromethylphenylbenzoate, and chloromethylphenyldodecylate, chloromethylphenyl phenylacetate, phenyl chloromethylbenzoate, bromomethyltoluene and bromomethylxylene.

Any of a wide variety of aromatic compounds can be chosen as the substrate material or co-reactant, and these can have substituent groups including alkyl, aryl, alkaryl, halogen, alkoxy, aryloxy, carboalkoxy, carboaryloxy, carboalkaryloxy, acyloxy, and hydroxy. The halogen can be fluorine, chlorine, bromine or iodine. Suitable substrate materials include all the previously mentioned halomethylaromatic compounds where the halomethyl groups are replaced by hydrogen or any of the previously mentioned substituents such as the hydrocarbons such as benzene, naphthalene, anthracene, durene, toluene, and xylene, as well as thiophene, dibenzylthiophene and the like. Suitable also are aromatic compounds containing one or more hydroxy groups as substituents; examples of the latter class include phenol, resorcinol, naphthol, bis(4-hydroxyphenyl)methane and bis(4-hydroxyphenyl)dimethylmethane.

Preferred substrate materials are those in which the aromatic ring is benzene, naphthalene, anthracene, and thiophene, in this order of preference, having one or two positions substituted by alkyl, alkoxy and halogen. At least one hydrogen, aryl, or radical containing an aromatic ring including alkaryl, aryloxy, carboaryloxy, carboalkaryloxy or acyloxy radicals should be substituted on the ring of the halomethyl aromatic reactant, and at least one and preferably at least two positions of the substrate material should be substituted by hydrogen, aryl, or a radical containing an aromatic ring including alkaryl, aryloxy, carboaryloxy, carboalkaryloxy or acyloxy radicals. Mixtures of several halomethylaromatic compounds or mixtures of several substrate materials or mixtures of both can also serve as reactants in the present process. As has been previously mentioned, the reaction can be conducted in the absence of a substrate by the self condensation of a halomethylaromatic compound; in these cases, the product will generally be a resin rather than an oil.

The catalyst used to promote the reaction of the present invention is a metal halide dissolved in a suitable solvent. The metal halide is selected from the group consisting of zinc chloride, zinc bromide, bismuth trichloride and bismuth tribromide. The solvent is selected from the group consisting of hydrochloric acid, hydrobromic acid, carboxylic acids, and substituted carboxylic acids.

Carboxylic acids are better than hydrochloric and hydrobromic acid, and of these, the aliphatic carboxylic acids are better than the aromatic ones. Aliphatic acids having a carbon skeleton of up to ten carbon atoms are preferred and in this group, acetic, propionic, and butyric acids are better. The most preferred solvent is acetic acid. Substituted carboxylic acids are less preferred than the parent acids. Substitutent groups include halogen and aryl radicals. Such acids are chloroacetic acid, phenylacetic acid and the like.

The most preferred metal halide is zinc chloride, followed by zinc bromide and bismuth trichloride and bismuth tribromide.

Any amount of catalyst solution is catalytic, but preferred is a quantity that will cause the reaction to proceed at a reasonably rapid rate. The concentration of solid halide solute may vary over the range of a few grams to about two hundred grams per one hundred milliliters of solvent, though any concentration is catalytic. Preferred is a range of from about fifteen to fifty grams of solute per one hundred milliliters of solvent.

For example, in a preferred embodiment, about twenty to forty grams of zinc chloride are dissolved in about one hundred milliliters of acetic acid.

The time required for the reaction to go to completion may vary from a few hours to several hours. The end point is marked by the cessation of evolution of hydrogen halide.

The condensations of the present invention may be carried out at widely differing temperatures; a good useful range is from about 75 degrees to about 275 degrees centigrade. Still better is the range from about 100 degrees to about 150 degrees centigrade and within this range, the reflux temperature is preferred. However, it will be appreciated by those skilled in the art that the minimum temperature in the present process is that at which the reaction will proceed and the maximum temperature is governed by the absence of objectionable degradation of the reactants and products.

The physical properties associated with the molecular weights of the fluids and resins of this invention, for example, pour point, viscosity volatility and solubility, are determined by the ratio of halomethylaromatic compound to substrate or aromatic material and by the composition of the reactants. In most applications, it is desirable to employ at least 0.25 mole of halomethylaromatic reactant per mole of aromatic reactant.

In Table I are shown in 21 examples the effects of varying the composition of the substrate material and the effect of changing the ratio of the halomethylaromatic reactant to substrate, on the pour point and viscosity of the product. These fluids can be "tailored" with respect to these and related properties by choosing the appropriate ratio of benzyl chloride to a particular substrate or by selecting the appropriate substrate for any one ratio of reactants. In each example, benzylchloride was added to a hot or refluxing solution of substrate, acetic acid and zinc chloride and the reaction mixture was then heated at a reflux until the evolution of hydrogen chloride had ceased. The product was isolated and purified as described in subsequent examples.

TABLE I.—PROPERTIES OF FLUIDS PREPARED FROM HALOMETHYL AROMATIC REACTANT (BENZYL CHLORIDE) AND VARIOUS SUBSTRATES

| Example | Substrate | Molar Ratio Benzylchloride Substrate | Pour Point (° C.) | Viscosity at 25° C. (Centipoises) |
|---|---|---|---|---|
| 1 | Benzene | 1.5 | −25 | 50 |
| 2 | do | 1.6 | −18 | 96 |
| 3 | do | 2.0 | −11 | 179 |
| 4 | do | 1.5 | −31 | 28 |
| 5 | do | 1.6 | −30 | 31 |
| 6 | do | 2.0 | −23 | 53 |
| 7 | do | 2.13 | −13 | 95 |
| 8 | do | 2.5 | −6 | 163 |
| 9 | Xylene | 1.5 | −25 | 54 |
| 10 | Decylbenzene | 2 | 20 | 1,248 |
| 11 | do | 1 | −9 | 271 |
| 12 | do | 0.7 | −20 | 129 |
| 13 | Phenol | 2.0 | −2 | 500 |
| 14 | do | 1.5 | −11 | 152 |
| 15 | Chlorobenzene | 1.5 | | 27,050 |
| 16 | do | 1.0 | 0 | 1,680 |
| 17 | Diphenyl | 1.4 | −15 | 101 |
| 18 | Thiophene | 1.5 | | 247 |
| 19 | Diphenylether | 2.0 | −18 | 100 |
| 20 | α-Chloronaphthalene | 2.5 | 10 | 3,980 |
| 21 | Anisole | 2.5 | −9 | 171 |

The pour points and viscosities listed for Examples 1–12 were determined on samples that had been heated in a distillation apparatus for 24 hours at 350° in a nitrogen atmosphere for the purpose of removing volatile components. Generally, the samples were lighter in color and more stable to air oxidation after this treatment.

The proportions of halomethylaromatic compound to substrate material selected for preparing these fluids is not always the same as the proportion of these components actually incorporated in to the product, especially when comparing fluids made from different substrates. Thus, a comparison of two fluids prepared from the same halomethylaromatic compound but from different substrate materials, for example, benzene and phenol, will show that proportionately less of the relatively volatile and non-reactive benzene than of the highly reactive and less volatile phenol has been incorporated into the product, although the same ratio of reactants was employed in each preparation. The following additional examples are given by way of illustration.

Example 22

To a stirred refluxing solution of 760 grams (8.27 moles) of toluene, 100 grams of zinc chloride, and 250 milliliters of acetic acid were added, 2210 grams (17.4 moles) of benzyl chloride over a two hour period. The mixture was then heated at reflux, final temperature 146° C., until hydrogen chloride evolution ceased, after about five hours. A product having two layers resulted and the catalyst layer was removed while the organic layer, after dilution with 600 ml. of chloroform, was washed with water until neutral. This solution was then dried over anhydrous magnesium sulfate, heated at 100° C. with decolorizing charcoal and fuller's earth, cooled, and filtered. Recolorizing charcoal and absorbent clay were added to the filtrate. The chloroform was removed from this slurry by distillation to a temperature of 150° C. at a reduced pressure of 15 millimeters of mercury in a rotating evaporator. The residue was cooled and filtered to give a golden, yellow oil having the following properties:

| | |
|---|---|
| Pour point, °C. | −13 |
| Viscosity, 25° C. centipoises | 95.0 |
| Viscosity, 100° F. do | 39.6 |
| Viscosity, 210° F. do | 4.63 |
| Flash point, °F. | 405 |

Example 23

Chlorobenzyl chloride, 631 grams (3.92 moles), was added over one-half hour to a stirred solution, heated at reflux, of 262 grams (3.36 moles) of benzene, 25 grams of zinc chloride and 75 milliliters of acetic acid. The mixture was then heated at reflux until hydrogen chloride was no longer given off (about two hours). A product having two layers was obtained and the organic layer was separated and taken up in 200 milliliters of chloroform. This solution, after washing with water until neutral, was stripped at 150° C. at a reduced pressure of 15 millimeters of mercury to leave 615 grams of residue having a pour point of −29° C. and a viscosity of 31 centipoises at 25° C.

Example 24

Chloromethyltoluene, 250 grams (1.79 moles) was added to a stirred refluxing solution of 80 grams (0.87 moles) of toluene, 10 grams of zinc chloride and 25 milliliters of acetic acid over a one hour period. The temperature of the mixture was then raised to 175° C. by distilling off part of the toluene and maintained at that temperature until hydrogen chloride was no longer given off, after about two hours. The product, after isolation by the procedure of the preceding example, was a clear, reddish brown oil, having a pour point of −10° C.

Example 25

To a stirred refluxing solution of 190 grams (2.07 moles) of toluene, 25 grams of zinc bromide (ZnBr$_2$), and 62 milliliters of acetic acid were added 525 grams (4.16 moles) of benzyl chloride over a two hour period. The mixture was then heated at reflux until hydrogen chloride ceased to evolve. A product having two layers resulted and the catalyst layer was separated while the organic layer, after dilution with 150 milliliters of chloroform, was washed with water until neutral. This solution was then dried over anhydrous magnesium sulfate, heated at 100° C. with decolorizing charcoal and fuller's earth, cooled and filtered. Decolorizing charcoal and absorbent clay were added to the filtrate. The chloroform was removed from this slurry by distillation to a temperature of 150° C. at a reduced pressure of 15 millimeters of mercury in a rotating evaporator. The residue was cooled and filtered to give a yellow oil having a viscosity of 61.5 centipoises at 26° C.

Example 26

To a stirred refluxing solution of 152 grams (1.65 moles) of toluene, 20 grams of bismuth trichloride, and 50 milliliters of acetic acid were added 442 grams (3.49 moles) of benzyl chloride over a two hour period. The mixture was then heated at reflux until hydrogen chloride ceaser to evolve. A product having two layers resulted and the catalyst layer was separated while the organic layer, after dilution with 120 milliliters of chloroform, was washed first with dilute acid and then with water, until neutral. This solution was then dried over anhydrous magnesium sulfate, was heated at 100° C. with decolorizing charcoal and fuller's earth, and was cooled and filtered. Decolorizing charcoal and absorbent clay were added to the filtrate. The cholorform was removed from this slurry by distillation to a temperature of 150° C. at a reduced pressure of 15 millimeters of mercury in a rotating evaporator. The residue was cooled and filtered to give a golden yellow oil having a viscosity 77 centipoises at 27° C.

Example 27

Following the procedure of Example 26, a polybenzyl oil is also obtained using bismuth tribromide as the catalyst.

Example 28

To a stirred refluxing solution of 152 grams (1.65 moles) of toluene, 20 grams (0.146 moles) of zinc chloride, and 50 grams (0.675 moles) of propionic acid were added 442 grams (3.49 moles) of benzyl chloride over a two hour period. The mixture was then heated at reflux until the evolution of hydrogen chloride ceased. A product having two layers resulted and the catalyst layer was decanted while the organic layer, after dilution with a portion of chloroform, was washed with water until neutral. This solution was then dried over anhydrous magnesium sulfate, heated at about 100° C. with a decolorizing charcoal and fuller's earth, cooled, and filtered. Decolorizing charcoal and absorbent clay were added to the filtrate. The cholorform was removed from this slurry by distillation to a temperature of about 150° C. at a reduced pressure of 15 millimeters of mercury in a rotating evaporator. The residue was cooled and filtered to give a golden yellow oil having a viscosity of 78 centistokes at 25 °C.

Example 29

To a stirred mixture of 500 milliliters of catalyst solution, prepared by dissolving 2630 grams of zinc chloride in one liter of concentrated hydrochloric acid, and 624 grams (8.0 moles) of benzene, heated at reflux, were added 2610 grams (20.6 moles) of benzyl chloride over a two hour period. Hydrogen chloride was given off during the addition. The reaction mixture was then heated at reflux until hydrogen chloride ceased to evolve. The mixture was then cooled and the lower catalyst layer was separated for reuse. One liter of chloroform was then added to the organic layer and the resulting solution was washed with water until neutral. The washed solution was then dried over anhydrous magnesium sulfate, stirred with absorbent clay, and filtered. The filtered solution was then stripped of chloroform and then heated in a distillation apparatus at 370° C. for one-half hour to remove volatiles to leave 2200 grams of a golden yellow oil. The oil had a pour point of −18° C. and a viscosity of 115 centipoises at 25° C.

Example 30

Benzyl chloride, 440 grams (3.47 moles) was added over a two hour period to a stirred, refluxing solution of 40 grams of zinc chloride and 100 milliliters of acetic acid. The mixture was then heated at 120–130° C. for three hours. Hydrogen chloride evolution began shortly after the start of the addition period and stopped toward the end of the three hour heating period. The reaction mixture was diluted with 300 milliliters of chloroform, the lower catalyst layer was separated, and the remaining portion was washed with three portions of warm water and then was stripped on a rotating evaporator at a final temperature of 150° C. at a reduced pressure of 25 millimeters of mercury. The product residue, 314 grams, was a yellow resin, melting at 90–110° C.

*Example 31*

To a solution of 5529 grams (5.87 moles) of phenol, 50 grams of zinc chloride and 125 milliliters of acetic acid heated at 70° C. were added 1110 grams (8.8 moles) of benzyl chloride over a one hour period. The reaction mixture was then heated to 140° C. over 1.5 hours. After cooling to room temperature, the mixture was poured into 1.5 liters of water. The organic phase was separated and diluted with 500 milliliters of chloroform. The chloroform solution was washed with water until neutral and then was stripped under vacuum to yield 1282 grams of a residual product, which was a deep red oil. It had a pour point of —11° C. and a viscosity of 25° C. of 152 centipoises.

*Example 32*

A warm solution of 296 grams (1.69 moles) of 1,4-bis(chloromethyl)benzene and 264 (3.38 moles) of benzene were added over a 45 minute period to a stirred solution of 50 grams of zinc chloride in 125 milliliters of acetic acid heated to 65–85° C. The mixture was heated to reflux temperature (107° C.) over a two hour period and then was heated at reflux for three hours. After separating the catalyst layer, the organic layer was diluted with 100 milliliters of chloroform. The chloroform solution was washed with water and then stripped of volatiles at a temperature to 150° C. at a reduced pressure of 25 millimeters of mercury to leave 351 grams of residue which hardened to a brittle resin at room temperature.

As shown in the foregoing examples, the reaction product of the invention is readily separated into a product phase and a catalyst phase. It is often desirable to add to the reaction mixture prior to phase separation a suitable diluent that is a solvent for the product of the invention, but which is immiscible with the catalyst phase. Such a diluent facilitates the phase separation step and aids in subsequent purification of the product. Alternatively, the diluent can be added to the product phase after phase separation to facilitate subsequent purification steps, such as washing with water and the like. Suitable diluents are the chlorinated hydrocarbons such as chloroform, dichloroethane, trichloroethylene, perchloroethylene, and the like. The diluent is readily removed from the product by distillation.

The hydrocarbon fluids prepared by the above procedures (Examples 1–32) have good oxidative stability, are essentially non-corrosive and are stable at elevated temperatures. These properties make them useful in heat-transfer fluids and as hydraulic fluids in systems not exposed to excessive concentrations of air.

These fluids were subjected to the conditions of an oxidation-corrosion test patterned after Method 5308.4 of the Federal Test Method Standard No. 791 of December 15, 1955, to determine their stability to air at 400° F. and to observe any corrosiveness toward steel and copper under these conditions. Previous to the test, the samples were heated for 24 hours at 350° C.

Clean dry air was passed through 100 milliliters of a sample fluid heated at 400° F. for 24 hours at a rate of five liters per hour. Submerged in the sample fluid and in contact with the air stream were test strips of steel (ASTM 1010, cold rolled steel) and copper. The viscosity of the samples, before and after the test, and the weight change of the metal strips were determined. The results are tabulated below:

TABLE II.—400° F. OXIDATION-CORROSION TEST VISCOSITY AND TEST-STRIP WEIGHT CHANGE

| Reactants Used to Prepare Sample | Viscosity at 25° C. in Centipoises | | Test-strip Weight Change, mg./sq. cm. | |
|---|---|---|---|---|
| | Before | After | Steel | Copper |
| Toluene-benzyl chloride | 31.1 | 56.4 | −0.07 | −0.09 |
| Decylbenzene-benzyl chloride | 129 | 240 | +0.02 | −0.07 |

A sample of a fluid prepared from benzyl chloride and toluene was heated in an atmosphere of nitrogen at 350° C. for 100 hours; substantially no degradation was observed. The viscosity of the material was 61.8 before the heating and 70.4 thereafter, measured in centipoises at 25° C. Similar testing of the other embodiments of the invention results in similar evidences of stability to high temperatures and pressures, as well as non-corrosive effects.

These severe tests prove that the low molecular weight resins of this invention are useful as heat transfer fluids, hydraulic fluids, and heat-stable fuels. They operate successively in such applications, being useful to transfer heat (in the manner of Dowtherm); to absorb shock in shock-absorber applications as a hydraulic fluid; and do not carbonize or polymerize when heated preparatory to combustion.

While the invention has been described with reference to certain specific embodiments, it will be recognized by those skilled in the art that many variations are possible without departing from the spirit and scope of the invention.

What is claimed is:

1. The process of producing compositions of aromatic rings joined by methylene groups wich comprises: heating (I) a halomethyl-substituted aromatic compound with (II) a member of the group consisting of (a) a halomethyl-substituted aromatic compound, and (b) an aromatic reactant; both the halomethyl-substituted aromatic compound and the aromatic reactant having at least one position occupied by a member selected from the group consisting of hydrogen, aryl, alkaryl, aryloxy, carboaryloxy, carboalkaryloxy, and an aromatic acyloxy radical, the remainder of the positions of the halomethyl-aromatic compound being occupied by a member selected from the group consisting of hydrogen, halogen, alkyl, aryl, alkaryl, alkoxy, aryloxy, carboalkoxy, carboaryloxy, carboalkaryloxy and acyloxy, and the remainder of the positions of the aromatic reactant being occupied by a member selected from the group consisting of hydrogen, halogen, alkyl, aryl, alkaryl, alkoxy, aryloxy, carboalkoxy, carboaryloxy, carboalkaryloxy, acyloxy and hydroxy; in the presence of solution of (III) a solute selected from the group consisting of zinc chloride, zinc bromide, bismuth trichloride and bismuth tribromide dissolved in (IV) a solvent comprised of a carboxylic acid.

2. The process of claim 1 in which the halomethyl substituent is chloromethyl.

3. The process of claim 1 in which the halomethyl substituent is bromomethyl.

4. The process of claim 1 in which the aromatic ring of the halomethyl-substituted aromatic compound is selected from the group consisting of benzene, naphthalene, anthracene, and thiophene.

5. The process of claim 1 in which the aromatic reactant is selected from the group consisting of: benzene, toluene, xylene, decylbenzene, phenol, chlorobenzene, diphenyl, thiophene, diphenylether, α-chloronaphthalene and anisole.

6. The process of claim 1 in which the halomethyl-substituted aromatic compound is benzyl chloride.

7. The process of claim 1 in which the carboxylic acid is acetic acid.

8. The process of claim 1 in which the solute portion of the catalyst solution is zinc chloride.

9. The process of claim 1 in which the solute portion of the catalyst solution is bismuth trichloride.

10. The process of claim 1 in which the solute portion of the catalyst solution is zinc bromide.

11. The process of claim 1 in which the reactants are refluxed in the presence of the catalyst solution.

12. The process of claim 1 wherein the reaction mixture is phase separated and the product phase is withdrawn as the product of the process.

13. The process of claim 12 in which a chlorinated hydrocarbon is added to the reaction mixture, the resulting mixture is phase separated, the product phase is withdrawn from the mixture, and the chlorinated hydrocarbon is separated from the product.

14. The process according to claim 1 in which a halomethyl-substituted aromatic compound is heated with the catalyst solution, whereby the compound self-condenses to form the product.

15. The process of producing a composition comprised of phenyl rings joined by methylene groups which comprises contacting benzyl chloride atnd toluene with a solution of zinc chloride in acetic acid at a temperature from about 75 to about 275° C.

16. The process of producing a composition comprised of phenyl rings joined by methylene groups which comprises contacting benzyl chloride with a solution of zinc chloride in acetic acid at a temperature from about 75 to about 275° C.

References Cited

UNITED STATES PATENTS

| | | | |
|---|---|---|---|
| 2,377,433 | 6/1945 | Lieber | 260—668 X |
| 2,660,572 | 11/1953 | Feasley | 252—73 X |
| 2,870,098 | 1/1959 | Martin et al. | 260—2 |
| 3,076,875 | 2/1963 | Kiessling et al. | 260—2 |
| 3,109,868 | 11/1963 | Fields et al. | 260—668 |
| 3,203,898 | 8/1965 | Harris | 260—668 X |

FOREIGN PATENTS

| | | |
|---|---|---|
| 961,958 | 6/1964 | Great Britain. |

OTHER REFERENCES

Olah: Friedel-Crafts and Related Reactions, vol. I; pages 28–30, 271, 290.

Radziewanowski: Berichte, vol. 27, pp. 3235–3238.

DELBERT E. GANTZ, *Primary Examiner.*

C. R. DAVIS, *Assistant Examiner.*